(12) United States Patent
de Souza (10) Patent No.: US 7,626,599 B2
(45) Date of Patent: Dec. 1, 2009

(54) CONTEXT MAP IN COMPUTER DISPLAY MAGNIFICATION

(75) Inventor: Jeremy de Souza, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 368 days.

(21) Appl. No.: 11/180,447

(22) Filed: Jul. 12, 2005

(65) Prior Publication Data

US 2007/0013722 A1    Jan. 18, 2007

(51) Int. Cl.
*G09G 5/00* (2006.01)

(52) U.S. Cl. .................................. 345/661; 345/660

(58) Field of Classification Search ................ 345/660, 345/661
See application file for complete search history.

(56) References Cited

U.S. PATENT DOCUMENTS

| | | | | |
|---|---|---|---|---|
| 5,187,776 A * | 2/1993 | Yanker | ................. | 715/800 |
| 5,479,603 A | 12/1995 | Stone | | |
| 5,553,225 A * | 9/1996 | Perry | ................. | 715/786 |
| 5,652,851 A | 7/1997 | Stone | | |
| 6,057,840 A * | 5/2000 | Durrani et al. | ............ | 715/786 |
| 6,237,006 B1 * | 5/2001 | Weinberg et al. | ........ | 707/103 R |
| 6,275,866 B1 | 8/2001 | Boulia | | |
| 6,326,964 B1 | 12/2001 | Snyder | | |
| 6,417,867 B1 | 7/2002 | Hallberg | | |
| 6,433,885 B1 | 8/2002 | Verghese | | |
| 6,538,660 B1 | 3/2003 | Celi | | |
| 6,590,583 B2 * | 7/2003 | Soohoo | ................. | 345/660 |
| 6,704,034 B1 | 3/2004 | Rodriguez | | |
| 6,975,335 B2 | 12/2005 | Wantanbe | | |
| 7,171,558 B1 | 1/2007 | Mourad | | |
| 7,212,313 B1 | 5/2007 | Hoel | | |
| 7,239,732 B1 * | 7/2007 | Yamada | ................. | 382/132 |
| 7,369,102 B2 | 5/2008 | Luke | | |
| 2002/0122065 A1 | 9/2002 | Segal | | |
| 2002/0163547 A1 * | 11/2002 | Abramson et al. | ........ | 345/855 |
| 2004/0056899 A1 * | 3/2004 | Sinclair et al. | ........ | 345/800 |

(Continued)

FOREIGN PATENT DOCUMENTS

JP        2004272906 A    *  9/2004

(Continued)

OTHER PUBLICATIONS

Microsoft Window XP screen shot of Mouse Properties, 2001.*

(Continued)

*Primary Examiner*—Ulka Chauhan
*Assistant Examiner*—Jeffrey J Chow
(74) *Attorney, Agent, or Firm*—Workman Nydegger (57) ABSTRACT

Described is a context map that assists users in determining a current location within a source region of a display monitor that is being magnified. The context map comprises a visible image representing a location of the unmagnified region that is being magnified. The visible image may be an indicator such as a pointer, or a reduced-size representation of the desktop with an indicator therein. The visible image may be made to selectively appear, such as by user command. The magnified content may be displayed on one monitor, and the context map on another. The context map alternatively may be on the same monitor, possibly superimposed over some part of the magnified content. The magnification window may move with a pointing device, and the context map may be docked, or displayed over at least part of the floating window such that the context map also moves with it.

3 Claims, 9 Drawing Sheets

U.S. PATENT DOCUMENTS

| | | |
|---|---|---|
| 2004/0139330 A1 | 7/2004 | Baar |
| 2005/0068342 A1* | 3/2005 | Ouchi et al. ................ 345/684 |
| 2005/0116929 A1* | 6/2005 | Molander et al. ........... 345/157 |
| 2005/0289478 A1 | 12/2005 | Landman |
| 2006/0187229 A1 | 8/2006 | Shao |
| 2007/0013723 A1 | 1/2007 | de Souza |
| 2008/0114535 A1* | 5/2008 | Nesbitt ....................... 701/202 |

OTHER PUBLICATIONS

Office Action dated May 29, 2008 cited in related U.S. Appl. No. 11/180,859.

Office Action dated Nov. 26, 2008 cited in U.S. Appl. No. 11/180,859.

Office Action mailed Feb. 14, 2008 cited in related U.S. Appl. No. 11/180,859.

* cited by examiner

CONTEXT MAP IN COMPUTER DISPLAY MAGNIFICATION

BACKGROUND

Contemporary computer systems offer users the ability to magnify a portion of their display screen, typically for providing visually-impaired users with better accessibility to computers, although also offering mainstream users the benefit of magnification in certain contexts. The portion of the display screen that is magnified can be selectively based on where the mouse is located, where the keyboard is focused, and/or where the user is otherwise editing, e.g., when selecting content such as for cutting and pasting.

In general, when the user runs a magnifier, a magnification window is opened and the magnified content displayed in that window. The user can adjust the magnification window in size and position, adjust the magnification level, and possibly choose other effects, e.g., color inversion. One such magnifier program operates by driver hooking, to intercept graphics calls sent towards the video driver, essentially in a screen capture operation, where the magnifier program then scales up a corresponding graphics image in the magnification window.

Because with any magnification factor greater than 1×, the magnified image is larger than the source image. As a result, it is often necessary for the user to navigate to locate a desired portion of the source region for magnification in the magnification window. When working with a large source region, it is fairly easy for users to lose their orientation with respect to the source image, that is, the user sees a magnified image in the magnification window but cannot determine what portion of the source is being magnified.

SUMMARY

Briefly, various aspects of the present invention are directed towards a context map that assists a user in determining a current location within the source region that is being magnified. The context map is valuable with large magnification windows, such as when the magnification window covers most or all of the entire desktop.

When displaying magnified content, such as in a magnification window, a context map, comprising a visible image representing a location of the unmagnified content that is being magnified, is displayed. The visible image may be an indicator, a reduced-size representation of the entire desktop with an indicator therein, or virtually anything that serves as a map for the user. The visible image may be made to selectively appear and/or disappear, such as by user command.

The magnified content may be displayed on one monitor, and the context map on another monitor or display device. The context map may be on the same monitor as the magnified content, possibly superimposed over some part of the magnified content.

The magnification window may be a floating window that moves with a mouse or the like, or keyboard focus, and the context map may be docked, or displayed over at least part of the floating window such that the context map also moves with it.

Other advantages will become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Exemplary Operating Environment

Figure 1:
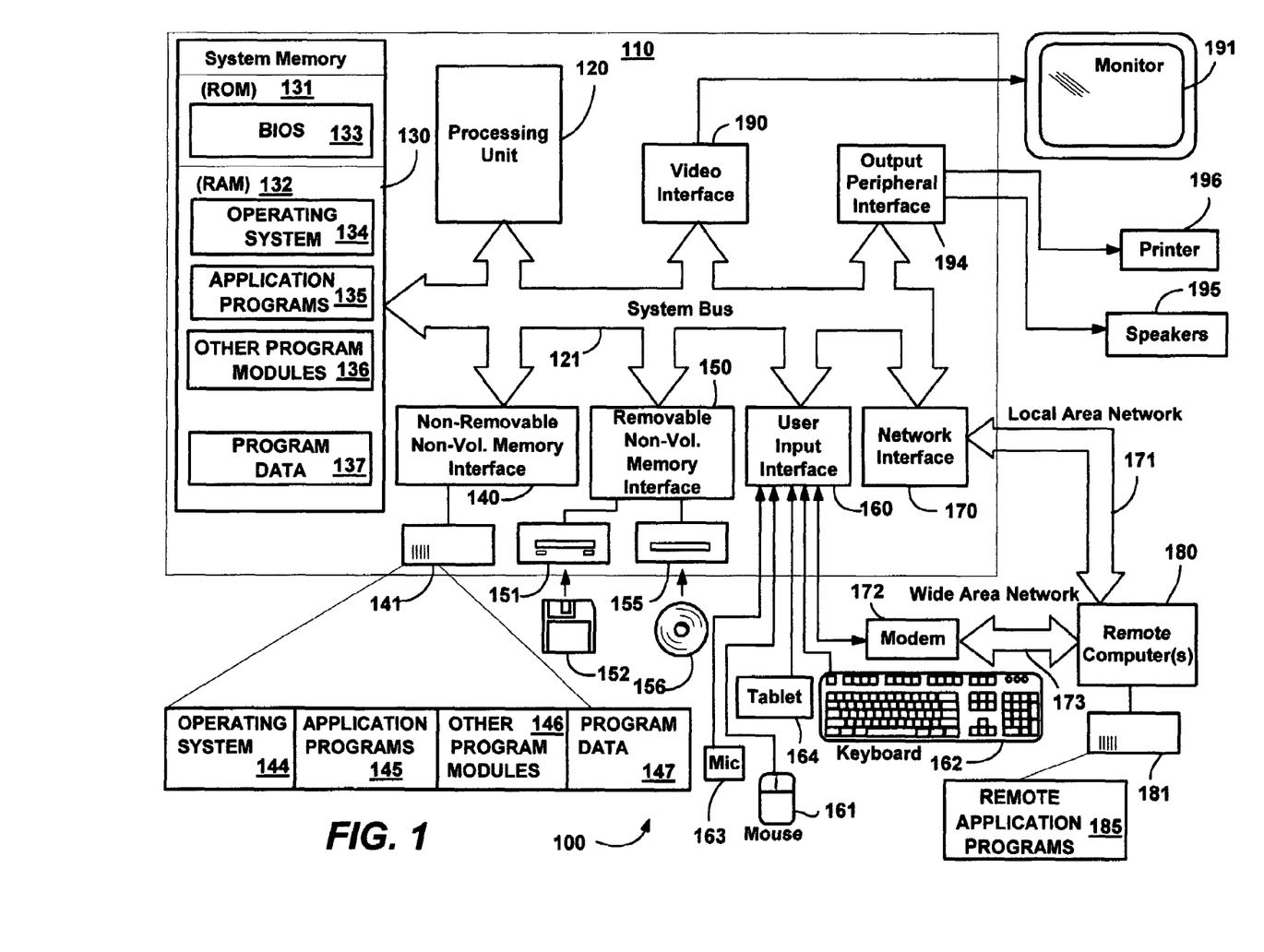
FIG. 1 shows an illustrative example of a general-purpose computing environment into which various aspects of the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, described above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Magnification Engine and API

Various aspects of the technology described herein are directed towards providing a context map by which a user may maintain a sense of orientation of the source when viewing magnified content. In one example implementation, this is accomplished by a magnification program that works with a magnification engine and application program interface (API), wherein the engine provides much of the functionality needed to couple the magnification application program to a computer system, such as via operating system components. One such magnification engine/API are described in copending U.S. patent application Ser. No. 11/180,859, filed Jul. 12, 2005 and entitled "Magnification Engine and Interface for Computers", filed concurrently herewith, assigned to the assignee of the present invention, and hereby incorporated by reference.

In one example implementation described herein, the magnification engine and interface are described in the form of a Win32 control that may be hosted by any application program, or run independently (e.g., via an operating system shell). However, as will be understood, the present invention is not limited to controls in general or a Win32 control, let alone any particular implementation or examples described herein. Instead, numerous ways to implement the present invention are feasible, and as such, the present invention is not limited to any of the particular examples used herein, but rather may be used various ways that provide benefits and advantages in computing in general.

Figure 2:
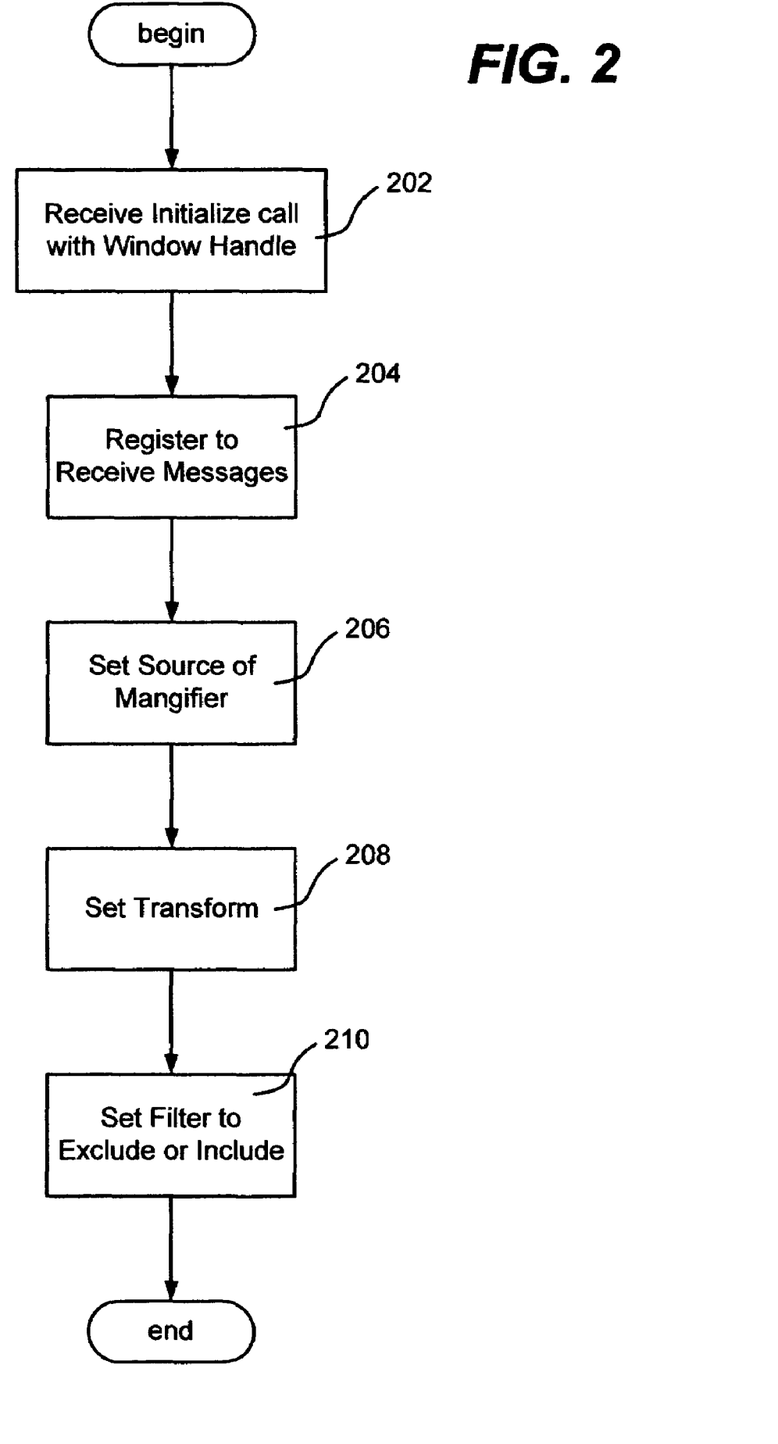
FIG. 2 is a flow diagram representing example steps in providing a magnifier in accordance with various aspects of the present invention.

Turning to FIG. 2 of the drawings, there is shown a general flow diagram for operating a magnifier, as described herein in the form of a control. In general, any program window may be a magnification window, and thus, for example, a program may open a window like a dialog or other pop-up window and use it for showing magnified images of another region of the screen. To set up a window as a magnification window, a program receives a window handle (hwnd) in a regular manner, e.g., in one implementation, magnification windows are created via the CreateWindow API.

Once created, the program calls an initialize function of a magnification engine/API (via an application program interface), providing the handle. This is generally represented in FIG. 2 via step 202. Step 204 represents the magnification engine/API 310 (FIG. 3) registering to receive window messages. The caller of the API, in this example a magnifier application program, also identifies the region to be magnified, which may be any practical rectangle up to the entire desktop. This is represented via step 206, where the caller identifies the magnification source. Note that the magnification source can change; for example, a window may surround the mouse pointer, e.g., with the mouse pointer centered therein. As the mouse pointer is moved, the source changes, so that everything under the mouse pointer appears magnified as the mouse pointer moves over it. Note that such a mouse-pointer-magnification window alternatively may be fixed on the desktop, however the source may still change with the mouse pointer and thereby change the contents of the magnification window.

Step 208 represents obtaining the transform that is (typically) used for the magnification level, e.g., 2×, 3×, and so forth. Note that the transform can designate something other than magnification, e.g., skew, and that if magnification is used, the magnification may be 1× (no magnification) or some fraction smaller than 1×, e.g., a reduced size image may be shown. Thus, although the present invention is primarily described herein with reference to magnification, any transform, including an identity transform that does not technically magnify or reduce, may be applied.

Step 210 represents the concept of selective window magnification, or filtering. More particularly, not everything in a designated region needs to be magnified. Instead, the magnification engine/API allows the program to designate which windows to magnify, and which ones should be excluded from the final magnified output. Note that the magnifier window never magnifies itself, although it would be feasible to do so. Filtering may be via inclusion or exclusion. Thus, a program may specify a list of windows to include (but not the magnification window) or elect to magnify all windows except those specifically excluded (the magnification window will be excluded). In this manner, a program has significant flexibility as to what gets magnified.

Figure 3:
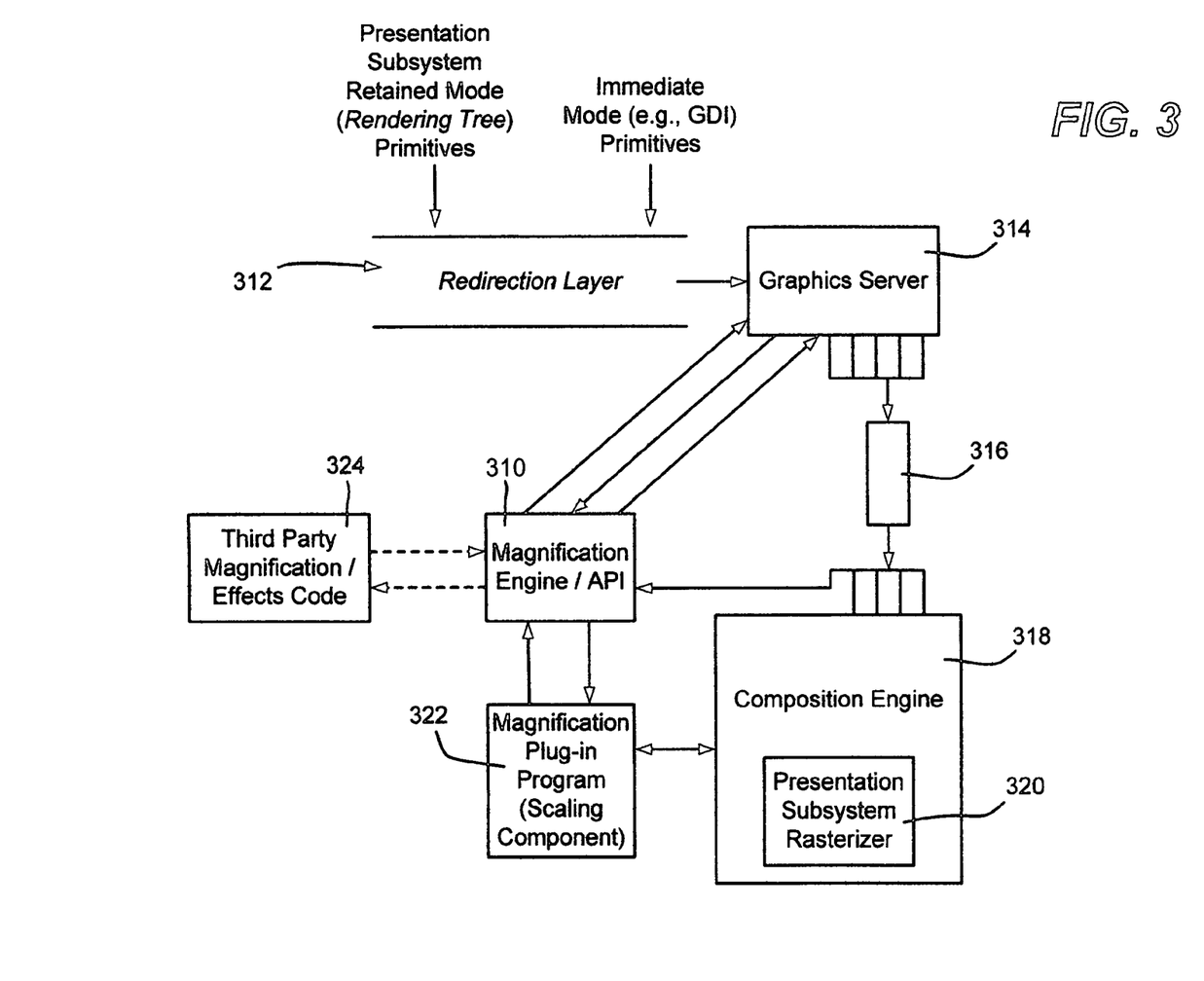
FIG. 3 is a block diagram representing an example implementation for magnifying text and graphics in accordance with various aspects of the present invention.

Once the magnification engine/API 310 is configured, FIG. 3 shows how the magnification engine/API 310 generally operates. FIG. 3 shows an example graphics processing configuration in which possibly different types of graphical data are provided by application programs and the like for rendering on a display. One well-known type of graphical output is immediate mode graphics, in which an application provides instructions (e.g., GDI primitives) to draw content (i.e., text and graphics) directly onto the display. Another type of graphical output is retained mode graphics, such as from a program of a presentation subsystem that provides drawing primitives from which a screen graph, or rendering tree, is constructed on a surface for that program. The rendering tree is then processed to obtain the appropriate output. For purposes of explanation herein, "GDI" is typically used to refer to the primitives and content that programs intend for immediate mode graphics (even if actually retained via redirecting to a surface), while "rendering tree" data is used to refer to the primitives and content that programs intend for retained mode graphics.

In order to composite immediate mode graphics and retained mode graphics, a redirection layer 312 essentially sends the GDI graphics to a surface, as if the immediate mode graphics were retained mode instructions. A graphics server 314, typically including a rasterizer or the like for handling GDI primitives, provides a graphics stream 316 containing one or more bitmaps and/or primitives from the various surfaces to a composition engine 318. The composition engine then composites the various output from the surfaces, and sends composited graphics data to a graphics card to render the graphical output.

In one implementation, for each set of GDI data, the graphics stream 316 may comprise a rasterized bitmap. This is because in this implementation, the composition engine 318 only includes a rasterizer 320 for the presentation subsystem's primitives (that correspond to a rendering tree), and does not rasterize GDI primitives.

Note, however, for GDI data that is to be magnified, the GDI primitives may be sent in the stream for processing by a magnification engine/API 310 and its connected components, which will rasterize the primitives prior to sending to the composition engine 318. More particularly, one way to magnify the visible content is to scale the content using its rasterized bitmap, as is done is conventional magnification. However, this generally provides a low quality and low performance result, but nevertheless is reasonable for existing immediate mode programs. Alternatively, by changing data of the primitives, e.g., doubling font size, line lengths and so forth for 2× magnification, magnification with better quality and performance is obtained.

FIG. 3 conceptually shows that part of the graphics stream is directed towards the magnification engine/API 310. As described above, to receive graphics primitives in an environment without driver hooking, the magnification engine/API registers for window messages. In general, any part of the graphics stream that is to be magnified is first sent to the magnification engine/API 3. This allows pre-processing and transforming of the graphics primitives, which generally comprises scaling.

Scaling may be accomplished by a plug-in client scaling component 322. Alternatively, or in addition to, magnification and other effects may be accomplished by a separate magnification effects program, referred to herein as a "third party" program 324, even though there is no intent to limit such a program to any particular vendor, and indeed, the provider of the magnification engine/API may also provide such a program. This provides extensibility, for example, as better magnification/effect programs become available, such as better quality bitmap magnification programs. Alternatively, an application that wants to implement its own StretchBlt algorithm (possibly with a different smoothing algorithm) can do so by setting the magnification transform to the desired transform, and then performing magnification in its own filter. Setting the transform is necessary for the presentation subsystem (e.g., Avalon/Media Integration Layer) primitive scaling which is not handled by the extensibility point. In one implementation, applications handle their own magnification via a SetMagnifierImageFilterCallback function. In general, at least one component for performing magnification is available.

For the magnified part of the stream, the magnification engine 310 thus may process the primitives and/or bitmaps as configured, and return the modified data to the graphics server and/or composition engine as appropriate. If still further (e.g., non-scaling) effects such as color effects are desired, the graphics server 314 and/or composition engine 318 may again call the magnification engine/API 310 for routing to the appropriate effects code. This is represented in FIG. 3 by the arrows between these components.

With respect to the rendering tree primitives, magnification or the like is straightforward, as a transform node may be added to the rendering tree by modifying the primitives. As mentioned above, GDI primitives may be transformed prior to rasterization to accomplish magnification and the like, or the GDI primitives may be rasterized into a bitmap, with the bitmap magnified in a known manner, e.g., as conventionally accomplished. In any event, the graphics stream 316 ultimately contains the various surfaces comprising primitives and/or bitmaps, including the data corresponding to the magnified content.

Figure 4:
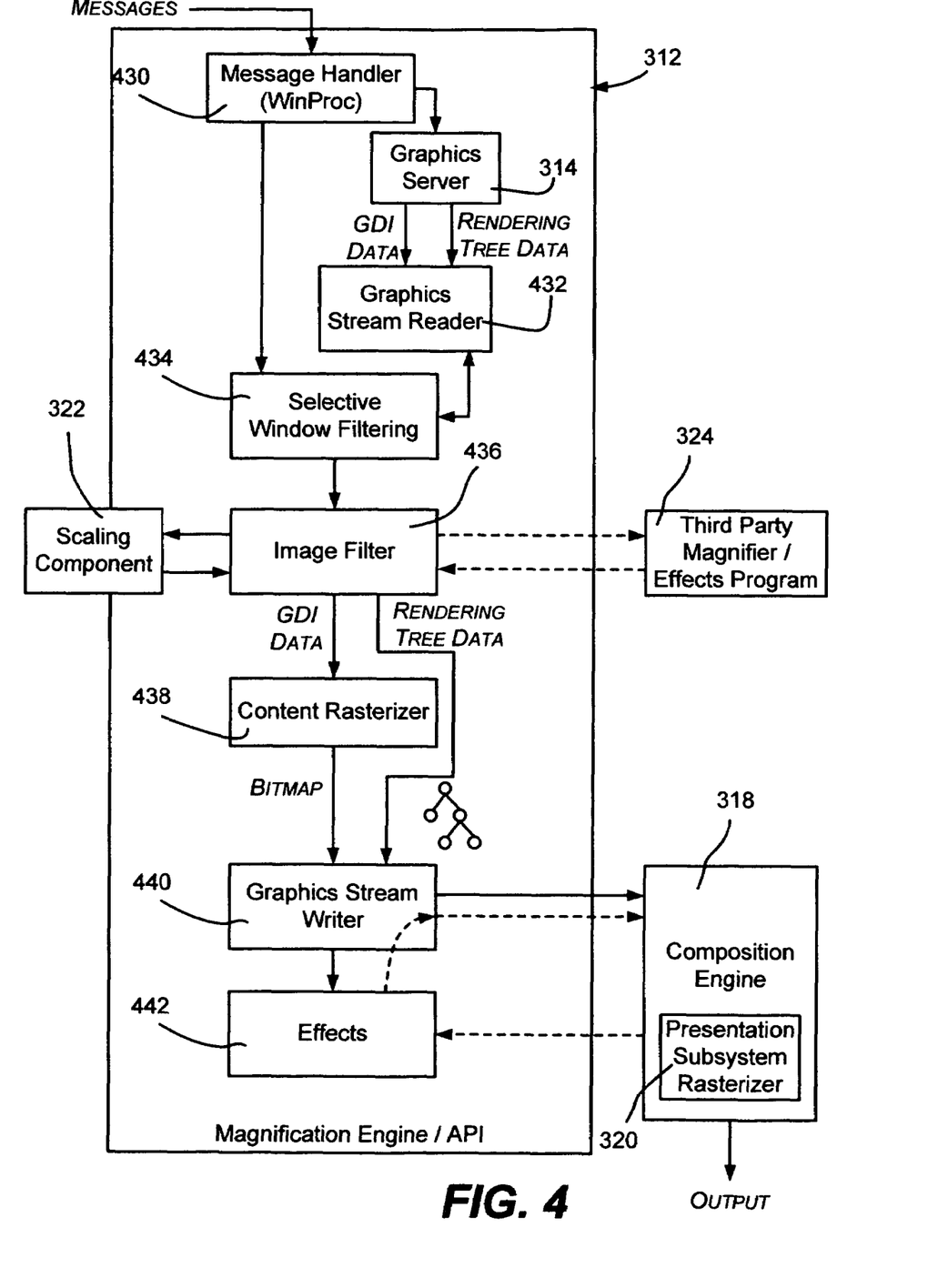
FIG. 4 is a block diagram representing various components within an example magnification engine in accordance with various aspects of the present invention.

FIG. 4 shows the various components, including further detail of the magnification engine/API 310. A message handler component 430 receives the messages that come into the registered control, as described above. This is the WinProc for the actual magnification window that handles incoming messages (matching the public APIs) and calls the appropriate internal components.

A graphics stream reader component 432 works with a selective window filtering component 434 so that only GDI data and rendering tree data from the graphics server 314 that correspond to included, or non-excluded, windows are processed for magnification. In one implementation, the graphics stream reader component 432 is a client of a Graphics Pipe (stream) API, and receives the raw packets from the graphics stream and hands them off to the selective window filtering component (HWND packet filter) 434. The selective window filtering component 434 filters the packets from the graphics pipe reader component based on the HWND associated with each packet. Magnifier HWNDs are always filtered out, and the inclusive or exclusive list of HWNDs is used to further filter the packets.

For relevant messages, that is, for source windows (e.g., based on their HWNDS) that are to be magnified, an image filter 436 works with the scaling component 322 and/or a third party magnifier 324 to scale the image, in the example of FIG. 4 by modifying the primitives. In general, the image filter 436 implements the callback mechanism for the plug-ins to implement custom image filtering code.

GDI content is then rasterized by a content rasterizer 438 prior to passing to a graphics stream writer 440, while rendering tree data is passed in its modified form to the graphics stream writer 440, where it will be rasterized. The content rasterizer 438 is responsible for rasterizing and compositing the packets. This component exposes three significant properties, namely transform, clip region (combines the source rect with the output clip from the output window) and output surface, where the output surface size is based on the clip region and transform.

The content rasterizer 438 is coupled to the graphics stream writer (composition engine writer) 440 to communicate with the graphics server and compose the magnified region of the desktop with the rest of the desktop. In this manner, the magnified data reaches the composition engine 318 in the appropriate graphics stream.

The magnified data may be returned to the magnification engine/API 312 for post-processing to add any effects, shown via effects component 442. In general, the effects component 442 implements the mechanism for other (e.g., third party) code to implement custom color effects. Note that although not specifically shown as such in FIG. 4, plug-in effects, such as the third part magnifier effects program 324 may be coupled to the effects component 442 to accomplish the desired effects. An application that wants to apply its own effects may do so by implementing effects in a custom pixel shader routine which is registered via the SetMagnifierColorEffectsShader function.

In this manner, magnification programs may be easily coupled to the computer system, while because the magnification API enables a magnifier to be implemented as a Win32 control, the magnifier control may be dropped into any suitable application program. It is possible to build a magnification client that enlarges a control and refreshes as the user moves from control to control.

Context Map

The magnification program, which may comprise the plug-in 322 or similar component, may provide a number of magnification modes. Once such mode corresponds to a docked or floating magnification window that tracks mouse position and/or keyboard focus; as the mouse/focus moves, the magnified content changes to correspond to the new position. Note that the magnification program supports multi-monitor configurations.

Another mode is a floating lens magnification mode, in which the floating lens magnifier is a floating magnification window that tracks the mouse cursor. The magnification window always contains the mouse cursor. In one implementation, the mouse cursor is always anchored in the center of the lens. This feature generally assists with the reading of text and magnification or specific UI elements.

Another mode is full screen magnification mode. In full screen magnification mode, the size of the magnifier's client area is equal to the physical viewable area of the display. In this mode, the entire desktop is magnified by a user specified scale factor. The user is then presented with a full-screen view of a portion of the magnified desktop. The user can work with the user interface displayed within that view. To work with another portion of the desktop, the user can pan the view, e.g., in eight directions (every 45 degrees). For desktops spanning multiple displays, a magnifier magnifies the entire desktop. Thus, the magnified view of the desktop with which the user interacts, or can pan around, can span several displays.

At any time, but in particular in the full-screen mode, it is relatively easy for a user to lose the current orientation with respect to the entire desktop. Various mechanisms provide a context map to assist the user in knowing the current location.

Figure 5:
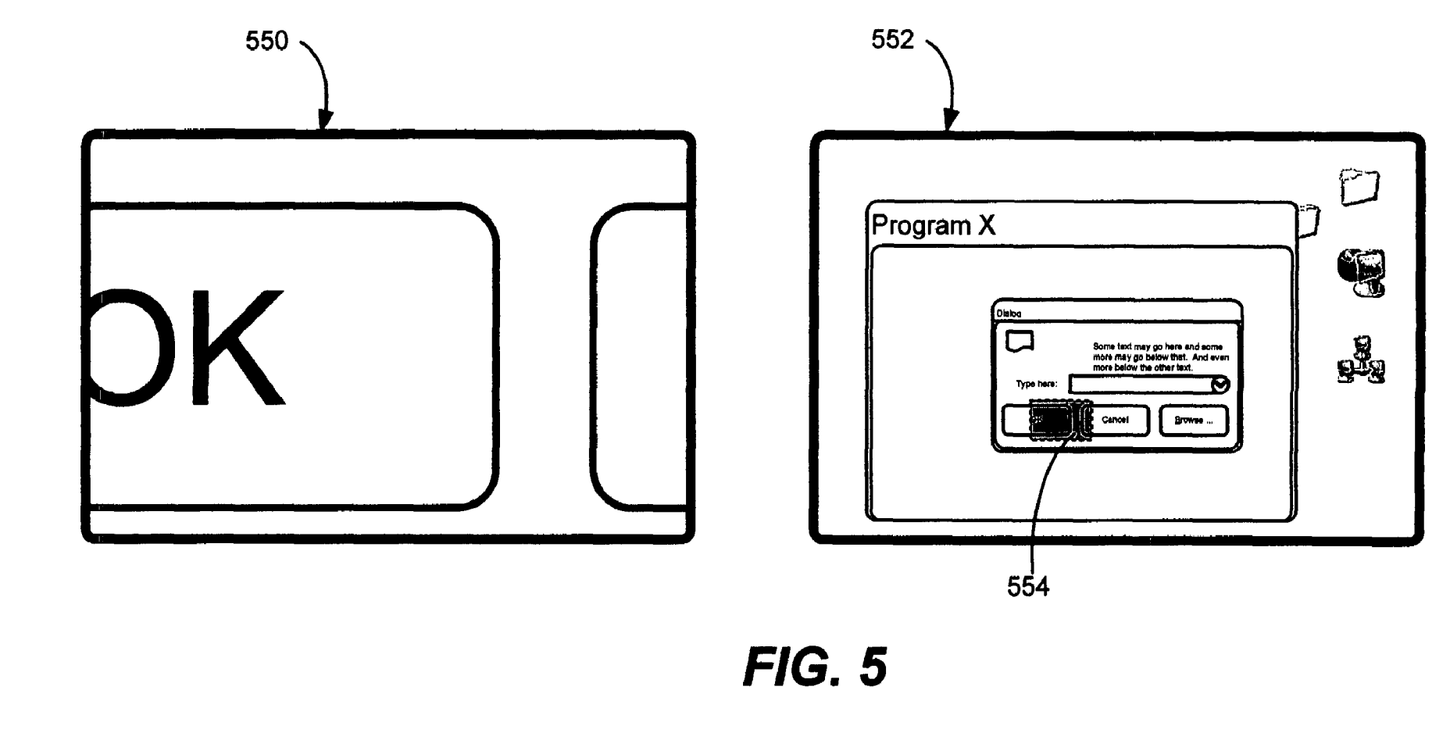
FIG. 5 is a representation of two monitors, one having a magnification window and one having a context map, in accordance with various aspects of the present invention.

For example, FIG. 5 shows a dual display, with one display 550 having full screen magnification, while a secondary display 552 shows a map comprising a cloned copy of the unmagnified desktop. The current view of the magnified desktop from the primary screen is superimposed thereon, as represented via the shaded area 554. Note that any appropriate visible indication is possible to show the current orientation on the desktop, such as a colored rectangle, shaded rectangle, flashing rectangle and so forth. Note that a rectangle that corresponds to the shape of the desktop may be used, however essentially any indicator, such as an arrow, may also be used. Also, a target-like representation such as concentric circles or other geometric shapes may be used to draw the user towards the mapped area, which may be relatively small. Further, note that although FIG. 5 shows two monitors substantially identical in size, the monitors may be different in size, type and/or relative locations, and one may even comprise an auxiliary display device rather than a more conventional dual-monitor configuration.

For a single monitor situation, various location mechanisms are feasible, and may be selectively rendered. For example, a keyboard key or key combination may cause a rectangle to flash to correspond to the area that is being magnified, or some other image such as arrows may appear. Alternatively, such an indicator may be visible at all times. In one implementation, if a user has a single display or does not wish to devote an entire display to a context map, a smaller context map may appear, e.g., in the bottom corner of the screen. When displayed, this smaller context map is always on top. Other indicators are feasible.

Figure 6:
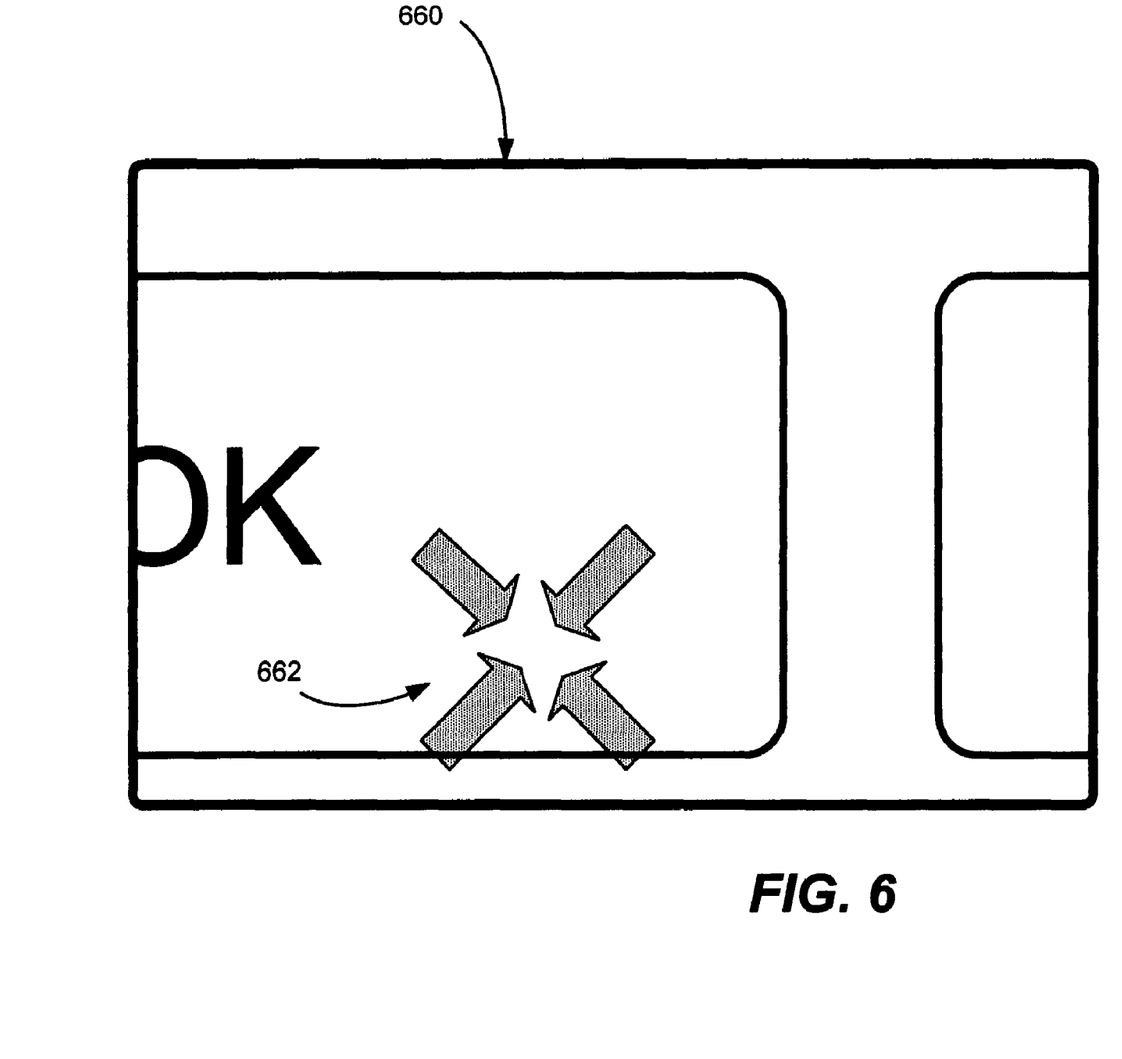
FIG. 6 is a representation of a context map comprising an indicator of the source location of unmagnified content, in accordance with various aspects of the present invention.

By way of example, FIG. 6 shows a magnified image on a single display 660 with a visible indicator in the form of four translucent arrows 662 that, for example, flash or selectively appear when a keyboard key or combination is pressed to show where the non-magnified source of the magnified image is located. Anytime the user wants to know the approximate location of the source, the user can invoke such an indicator and regain orientation.

Figure 7:
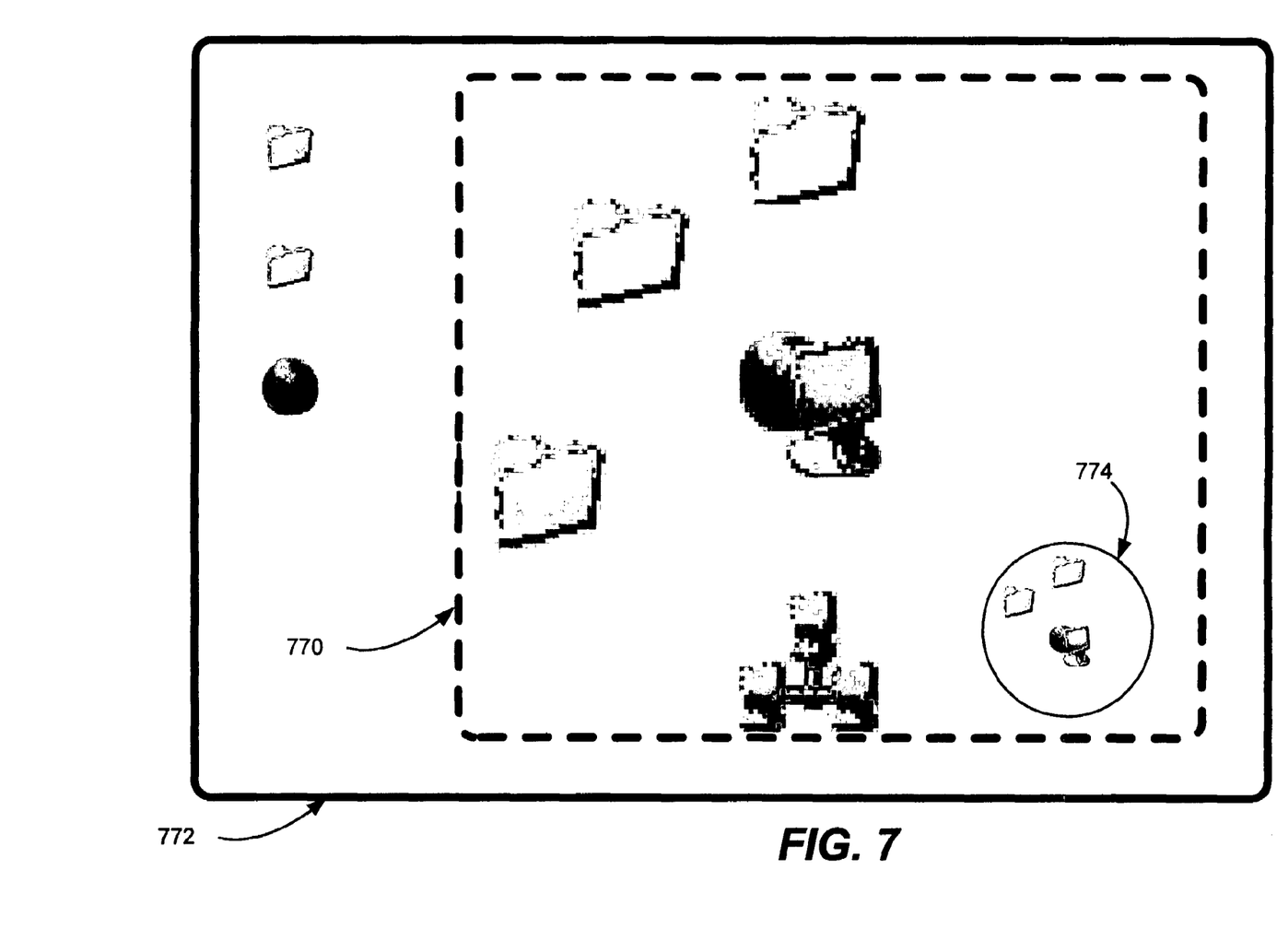
FIG. 7 is a representation of a context map within a floating magnification window, in accordance with various aspects of the present invention.

FIG. 7 shows an example of a context map in the floating lens magnification mode. In FIG. 7, the dashed box represents a magnification window 770 that moves with the cursor. In this example, the window is relatively large compared to the desktop 772. An area of the magnification window is non-magnified, essentially showing what is below the center of the window. In this example, the non-magnified area is represented by the circular region 774.

Figure 8:
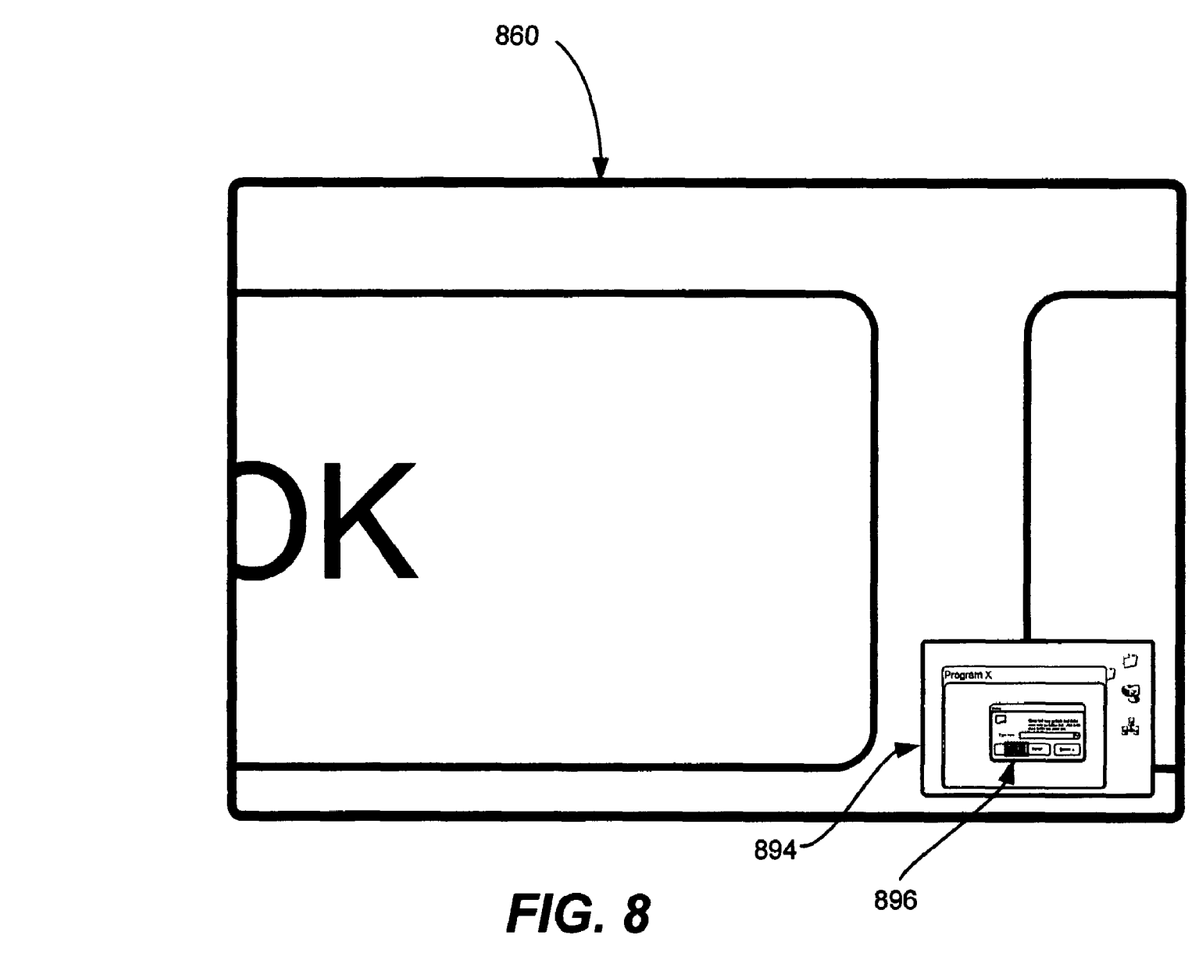
FIG. 8 is a representation of a magnification window on one monitor with a superimposed context map, in accordance with various aspects of the present invention.

FIG. 8 is another type of context map, in which a magnification window 860 consumes the entire monitor space, that is, full screen magnification mode. A context map 894 provides a scenario diagram with an indicator 896 highlighting the region being magnified. Note that this context map 894 may pop-up on command, e.g., via a key combination, and/or be semi-transparent. Further, note that the highlighting indicator 896 may be visibly enhanced, such as to be a certain color, flash and so forth to help the user locate the region; the user also may change the area being magnified by moving the indicator, that is, by navigating in the context map.

Figure 9:
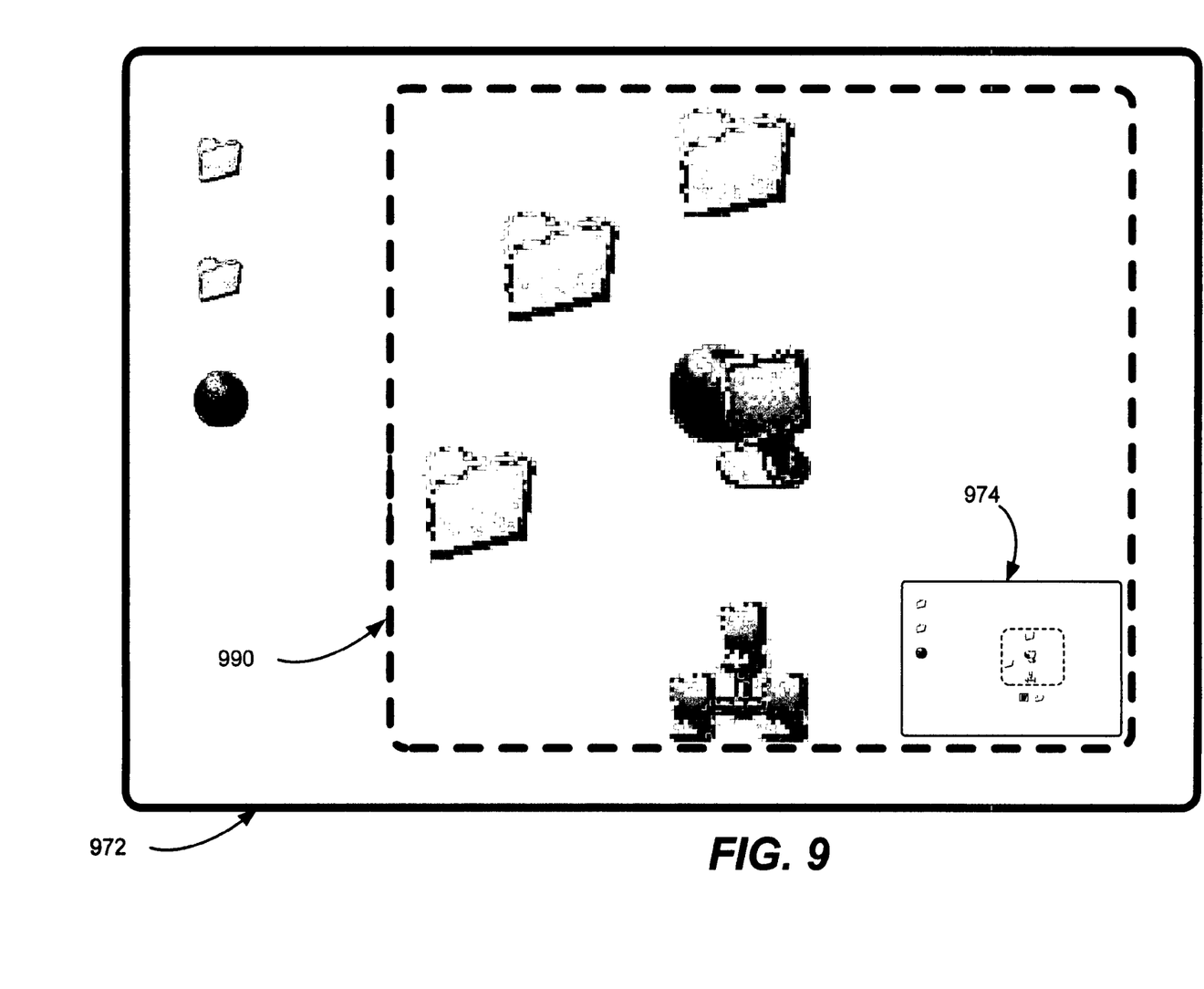
FIG. 9 is a representation of a context map within a floating magnification window, in accordance with various aspects of the present invention.

FIG. 9 is another example of a context map 974 in a floating lens magnification mode. In FIG. 9, the dashed box represents a magnification window 990 that moves with the cursor. In this example, the window is relatively large compared to the desktop 972, but need not be. An area of the magnification window is non-magnified, essentially showing what is below the center of the window. Note that instead of being within the magnification window 990, some or all of the context map 974 may fall outside the magnification window 990, or may be fixed by the user on the screen, such as in the lower right corner or at another location desired by the user.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment having a display device, wherein the display device displays magnified content corresponding to a portion of a desktop display, a method for superimposing a visual indicator on the magnified content to indicate the portion of the desktop display that is being magnified, the method comprising:

the display device receiving magnified content corresponding to the portion of the desktop display, wherein the portion of the desktop display is less than an entire desktop display;

determining the position of the visual indicator, wherein the position of the visual indicator is located at the position of the portion of the desktop display that is being magnified within the entire desktop display, wherein the visual indicator surrounds only the portion of the desktop display that is being magnified;

the display device displaying the magnified content on the display device such that the magnified content is displayed on the entire viewing area of the display device; and the display device displaying the visual indicator on the display device over the magnified content.

2. The method of claim 1 wherein the visual indicator comprises one or more arrows that point towards the portion of the desktop display.

3. The method of claim 2 wherein the arrows are displayed in response to user input.

* * * * *